United States Patent [19]

Pastor et al.

[11] Patent Number: 4,636,378
[45] Date of Patent: Jan. 13, 1987

[54] METHOD OF PREPARATION OF PEROVSKITE-TYPE COMPOUNDS

[75] Inventors: Ricardo C. Pastor, Manhattan Beach; Florentino V. Lee, Culver City, both of Calif.

[73] Assignee: Hughes Aircraft Company, Los Angeles, Calif.

[21] Appl. No.: 743,717

[22] Filed: Jun. 11, 1985

[51] Int. Cl.$^4$ ............................................. C01G 23/00
[52] U.S. Cl. ..................................... 423/598; 423/71; 423/84; 423/85; 423/608; 423/636; 501/135; 501/137; 502/525
[58] Field of Search ............... 423/598, 593, 608, 635, 423/636, 71, 84, 85; 502/525; 501/137, 136, 135

[56] References Cited

U.S. PATENT DOCUMENTS

| | | | |
|---|---|---|---|
| 4,040,983 | 8/1977 | Innes et al. | 423/598 |
| 4,293,534 | 10/1981 | Arendt | 423/593 |
| 4,461,844 | 7/1984 | Itakura et al. | 501/137 |
| 4,528,613 | 7/1985 | Stetson et al. | 501/137 |
| 4,530,031 | 7/1985 | Donohue | 501/137 |
| 4,543,341 | 9/1985 | Barringer et al. | 423/608 |
| 4,547,355 | 10/1985 | Uedaira et al. | 423/593 |

Primary Examiner—John Doll
Assistant Examiner—Anthony McFarlane
Attorney, Agent, or Firm—Wanda K. Denson-Low; A. W. Karambelas

[57] ABSTRACT

The present invention relates to a low temperature method of preparing a compound of the formula:

$$ABO_3$$

wherein
A = Ba, Sr, Ca and Pb; and
B = Ti, Zr and Hf,
by
(a) reacting a B-alkoxide, with a predetermined amount of aqueous A-hydroxide,
(b) heating the reaction mixture to an initial temperature of 100° C.–250° C. at 1–40 atmospheres of pressure;
(c) cooling the reaction mixture and thereafter, heating it to a subsequent temperature of approximately 40° C. to 60° C.;
(d) dialyzing the cooled reaction product and recovering the tenate.

12 Claims, 1 Drawing Figure

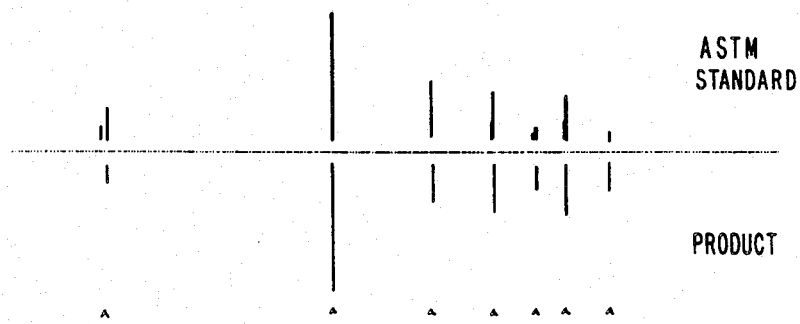

METHOD OF PREPARATION OF PEROVSKITE-TYPE COMPOUNDS

RIGHTS OF THE UNITED STATES GOVERNMENT

The Government has rights in this invention pursuant to Government Contract No. F19628-84-C-0069, awarded by the Department of the Air Force.

BACKGROUND OF THE INVENTION

1. Field of the Invention

The present invention relates to a low temperature method of preparing perovskite-type compounds. More particularly, this invention relates to a low temperature method of preparing compounds such as barium titanate, ($BaTiO_3$), a piezoelectric material, which is employed (in ceramic form) as an ultra-sound transducer. The method of this invention enables compounds such as barium titanate to be prepared under low temperatures to achieve good phase purity, better homogeneity, and better control of the stoichiometry of the compound.

2. Description of Background Art

Perovskite-type compounds, such as the titanates of the alkaline earth metals occur naturally, but are often too impure to be of much value. Compounds of this type typically have the formula, $ABO_3$. The compounds are generally synthesized by heating the pure oxides with titanium dioxide below the melting point of the compounds. Barium titanate ($BaTiO_3$), has five crystalline modifications: cubic, tetragonal, orthorhombic, trigonal, and hexagonal. In particular, the tetragonal form is stable between 5° and 120° C. The tetragonal form is important electrically because when it is exposed to a high DC electrical field, it is permanently polarized. After polarization, it then exhibits two useful properties: it is piezoelectric and ferroelectric. The piezoelectric property leads to applications such as underwater protection equipment, a transducer and ultrasonic equipment, etc. Barium titanate is more convenient than other piezoelectrics such as quartz since it can be readily fabricated in any desired shape. Its high dielectric constant and its temperature coefficient lead additionally to applications in the construction of small capacitors in temperature-sensitive devices that depend upon capacitance.

Multilayer ceramic capacitors are commonly made by casting or otherwise forming insulating layers of dielectric ceramic powder. Powdered metal titanates such as barium titanate etc., can be used as a starting charge to grow crystals. After conversion to single crystal form, these single crystals may then be fabricated at certain orientations which are more efficient than the ceramic counterpart, i.e, a hot pressed sintered powder.

Typically, as set forth in U.S. Pat. Nos. 3,682,766, 3,885,941 and 4,066,426, a base ceramic preparation of dielectric oxides is completely presintered to form a solid solution at high temperature. The material is then ground to a fine powder and mixed with glass frit. A major disadvantage of the prior art methods for making a low temperature fired ceramic capacitors, is the necessity for presintering the base ceramic preparation at a high temperature to form a solid solution of the constitutent oxides before mixing with the glass frit. Another disadvantage of the prior art is the large volume of glass frit necessary to achieve the low firing materials. Though U.S. Pat. No. 4,335,216 attempts to depict a high dielectric constant ceramic composition capable of being fired at temperatures below 1150° C., the operating temperatures show 900° C.–1000° C. Additionally, the ceramic compositions disclosed consist of mixtures of barium titanate, strontium titanate, barium zirconate, titanum dioxide, and manganese dioxide.

There are several other methods which can be utilized in the preparation of compounds such as barium titanate. One such method is disclosed in U.S. Pat. No. 4,485,094 (issued Nov. 27, 1984), which depicts a method for producing continuous mixed oxide films of the general formula $MO_n$ is disclosed, wherein "M" is a mixture of at least two metals and "n" is the number of oxygen atoms in the compound. The two metals, for example, could be barium, strontium, calcium, or mixtures thereof in combination with, for example, titanium, zirconium, hafnium or mixtures thereof. This reference, however, is concerned with the production of metal oxide films at temperatures between 500° C.–600° C.

Barium titanate, a perovskite-type compound, and certain related titanates and zirconates, when properly doped are semiconductive materials which undergo solid phase changes at particular temperatures. It should be noted that when these perovskite-type compounds undergo temperature changes, they may undergo phase changes as well. Therefore, perovskite-type compounds can exist in either a tetragonal, hexagonal, cubic etc. form, depending upon the temperature. Associated with these phase changes are very abrupt and large changes in the resistivity of these materials. The temperature at which such abrupt changes occur are referred to as the curie point and, because the change is positive with respect to temperature, the aforesaid titanates and zirconates are referred to as "positive temperature coefficient" materials. As a result of this temperature anomaly, and the resistance they exhibit, these materials have been found useful as thermosensing elements in numerous diverse applications.

The preparation of barium titanate and related positive temperature coefficient materials involves high temperature ceramic reactions which require careful proportioning of reactants and intermittent intermixture thereof to assure complete reaction and stoichiometric balance in the product. U.S. Pat. No. 3,932,313 (issued Jan. 13, 1976) discloses that an aqueous feed mixture, comprising a compound of barium or other suitable divalent cation, and an organic compound of titanium or zirconium is introduced into an interior zone adjacent a heated reaction zone. The heated reaction zone is a rotating, inclined, tubular furnace or other useful calcining equipment. At the entrance of the reaction zone, the feed mixture forms a mass which swells in response to heat emanating from the tube wall and the reaction zone undergoes dehydration and ignites. Particles break away from the mass and enter the reaction zone where they are calcined in an oxidizing atmosphere to produce the product material.

The careful proportioning of reactants and their intermixture, in processes such as those described above, are factors which are critical to a sharp and definitive response at the curie point. Because the reactants from which barium titanate is produced are solid at the reaction temperature, both the solid state diffusion-controlled reaction and the problem of separating unreacted material from the product render the realization of optimum properties difficult to achieve. In conventional solid state ceramic reaction processes, the raw materials tend to be inadequately mixed and additional contaminants are frequently introduced during mechanical mixing. Also, undesirable crystalline transformations such as anatase ($TiO_2$) to rutile transformation of titanium dioxide may occur during the process, and the product of the process often fails to possess the desired physical and electrical properties.

U. S. Pat. No. 2,988,422, discloses a process wherein a finely dispersed solution of titanium lactate and a barium compound is passed through a flame for volatilization of the solvent and thermo-decomposition of the barium and titanium compounds to crystalline barium titanate. The product is thus formed as a fine gas-borne dust and therefore process equipment must consequently be adapted for handling substantial volumetric flow rates relative to the rate of production. The fine dust product also presents obvious collection problems and in the case of toxic products such as lead titanate, the operation of this type of process may involve health hazards. Because of its exceptionally small particle size, moreover, the product of such a direct flame reaction process may also be susceptible to discontinuous grain growth. This can result in the formation of large individual grains in the fine grain material.

Though many methods are available for the preparation of compounds such as barium titanate, a low temperature method (less than 500° C.) is nevertheless needed. All of the high temperature methods previously discussed, unfortunately encourage the transportation of impurities from the walls of the apparatus. Additionally, at high temperatures, the reactants experience volatility problems, resulting in less stoichiometric control. Lastly, phase stabilization problems occur at increased temperatures causing the less desirable form of barium titanate, its hexagonal form, to be produced. The tetragonal form of barium titanate is desired, however, due to its unique electrical properties.

SUMMARY OF THE INVENTION

The present invention relates to a low temperature method of preparing a compound of the formula:

$$ABO_3$$

wherein
A=Ba, Sr, Ca and Pb; and
B=Ti, Zr and Hf,
comprising the steps of:
 (a) reacting a B-alkoxide with a predetermined amount of aqueous A-hydroxide:
 (b) heating the reaction mixture to an initial temperature of 100° C.–250° C. at 1–40 atmospheres of pressure;
 (c) cooling the reaction product to a temperature below 40° C. and thereafter, heating it to a subsequent temperature of approximately 40° C. to 60° C.;
 (d) dialyzing the cooled reaction product into a dialyzate and tenate and recovering the tenate.

More particularly, the present invention relates to a low temperature method of preparing perovskite-type compounds as barium titanate having increased phase purity, and better phase stabilization.

It is an object of the present invention to provide a method of preparing perovskite-type compounds of the formula $ABO_3$, wherein A=Ba, Sr, Ca and Pb; and B=Ti, Zr and Hf having good phase purity.

It is an additional object of the present invention to provide a method of preparing perovskite-type compounds of the formula $ABO_3$ as specified above, which is not diffusion limited, thereby providing better homogeneity of the molecule and further providing better control of the stoichiometry of these reactions.

It is a further object of the present invention to provide a process for the preparation of titanates of the formula $ABO_3$ as specified above, which allows better control of the valence of the dopant.

It is another object of the present invention to provide a low-temperature method of preparing barium titanate.

The foregoing and other advantages and features of the present invention will be apparent from the following description of the embodiments of the instant invention.

DESCRIPTION OF DRAWING

The FIGURE is an X-ray diffractogram comparing barium titanate powder produced according to the process of the instant invention (below) and the tetragonal barium titanate standard (above).*

* The standard X-ray diffractogram pattern shown in the upper portion of the FIGURE is provided by ASTM (American Standard of Testing Materials) X-ray powder data, File No. 5-0626.

DESCRIPTION OF THE INVENTION

The present invention relates to a low temperature method of preparing a perovskite-type compound of the formula:

$$ABO_3$$

wherein
A=Ba, Sr, Ca and Pb; and
B=Ti, Zr and Hf,
comprising the steps of:
 (a) reacting a B-alkoxide with a predetermined amount of aqueous A-hydroxide;
 (b) heating the reaction mixture to an initial temperature of 100° C.–250° C. at 1–40 atmospheres of pressure;
 (c) cooling the reaction to a temperature below 40° C. and thereafter, heating it to a subsequent temperature of approximately 40° C. to 60° C.; and
 (d) dialyzing the cooled reaction product into a dialyzate and tenate and recovering the tenate.

In the $ABO_3$ formula, A is A(II), a metal ion of oxidation number 2, and its oxide AO is a fairly basic oxide. The B is B(IV), a metal ion of oxidation number 4, and its oxide $BO_2$ is a fairly acidic oxide. Two structures are commonly encountered. When the ion size of A(II) is large compared to B(IV), cubic packing of the oxide ion results in what is known as the perovskite structure, the structure which can give rise to the ferroelectric behavior. When the metal ions have similar sizes, hexagonal packing of the oxide ion results in what is known as the ilmenite structure.

When B(IV)=Ti(IV), the compound is known as the metatitanate and which, for short, is called a titanate. However, the distinction should be kept in mind because of the orthotitanate, e.g., $Mg_2TiO_4$, a cubic structure with mp=1840° C. $CaTiO_3$, mp=1980° C., is the naturally-occurring mineral called perovskite. It has a dielectric constant of 140 at 21° C. and is used as an additive to $BaTiO_3$, mp=1625° C. $SrTiO_3$, mp=2080° C., dielectric constant 310, is also used as an additive to $BaTiO_3$. In the synthesis scheme of the instant invention, the mixed metatitanate, say $Ba_{1-x}Sr_xO_3$, is made under a saturated steam pressure of 2 atm (i.e., heated to 120° C.) as follows:

$$(1-x)Ba(OH)_2 + xSr(OH)_2 + (i\text{-}BuO)_4Ti + H_2O = Ba_{1-x}Sr_xO_3 + 4\ i\text{-}BuOH \qquad (1)$$

The symbol i-BuOH stands for $i\text{-}C_4H_9OH$, isobutyl alcohol.

Like the metatitanate, where B(IV)=Ti(IV), the metazirconate and hafnate can be formed. The same approach, viz., the preparation under a saturated steam pressure, can be used. These heavier-metal alkoxides will be even less volatile than the corresponding titanium compound. For instance, the ethoxide liquids exhibit the following volatilities: at a vapor pressure of 5.0 mm Hg, $(C_2H_5O)_4Ti$ has to be heated to 138.3° C. and $(C_2H_5O)_4Zr$ to 234.8° C. In the case of hafnium, the volatility is even lower: at 190° C., $(C_2H_5O)_4Hf$ develops a vapor pressure of only 0.1 mm Hg. The low-volatility feature is desirable in the preparation because the reaction to form the product occurs in the condensed phase, not in the vapor phase. Vapor-phase reaction between steam and the alkoxide slows down the progress of the reaction in the condensed phase. Again, in the synthesis scheme of the instant invention, the mixed meta-titanate and zirconate, say $BaTi_{1-y}Zr_yO_3$, is made under a saturated steam pressure of 2 atm (i.e., 120° C.) as follows:

$$Ba(OH)_2 + (1-y)(C_2H_5O)_4Ti + y(C_2H_5O)_4Zr + H_2O = BaTi_{1-y}Zr_yO_3 + 4\ C_2H_5OH. \qquad (2)$$

It should be noted that in instances where A(II) is more basic than B(IV), it is unnecessay to use the alkoxide of A(II) since it readily hydrolyzes in the aqueous medium to provide the hydroxide, as follows:

$$A(O-Et)_2 + 2H_2O \rightarrow A(OH)_2 + 2EtOH \qquad (3)$$

Hence it is more economical and practical to utilize the hydroxide (or oxide) of A directly.

Illustrative of the alkoxides of B(IV)-type compounds that can be utilized in the process of the instant invention include the methoxides, ethoxides, propoxides, butoxides, etc. of type B(IV) compounds.

The process of the present invention provides a low-temperature method of preparing perovskite-type compounds, for example, barium titanate which comprises first the reaction of, in this instance, titanium iso-butoxide, $(i\text{-}BuO)_4Ti$, with aqueous barium hydroxide, $Ba(OH)_2 \cdot 8H_2O$. Both titanium iso-butoxide and barium hydroxide are commercially obtainable. The barium hydroxide powder (obtained from commercial sources) is mixed with water to form the aqueous barium hydroxide solution noted above. The preferred amount of crystalline barium hydroxide powder utilized is 10% in excess of the stoichiometric equivalent. Due to the expense involved in obtaining titanium iso-butoxide commercially, it is advisable to utilize 10% in excess of the stoichiometric equivalent of barium hydroxide, in order to insure that all of the titanium reacts.

The titanium iso-butoxide is added dropwise to the aqueous suspension of barium hydroxide. This mixture is then covered with deionized water. A gel of $TiO_2 \cdot 2H_2O$ is formed by the hydrolysis of titanium butoxide as per the following reaction:

$$(i\text{-}BuO)_4Ti + 4H_2O \rightarrow 4(i\text{-}BuOH) + TiO_2 \cdot 2H_2O \qquad (4)$$

Second, the reaction mixture is then heated, preferably utilizing steam, to an initial temperature of 100° C.–250° C. at 1–40 atmospheres of pressure. It is preferred that the reaction mixture be heated to a temperature of 120° C. at 2 atmospheres of pressure. By utilizing saturated steam as a heat source, the operating temperature chosen, automatically controls the saturated steam pressure. Additionally, at saturated steam pressure, water is present as a reactant at its most reactive state as per equation (4).

The reaction mixture is then cooled to below 40° C. to lower the saturated steam pressure below 1 atm and to allow the safe opening of the pressure vessel. Following this cooling step, the mixture is again heated to approximately 40° C. to 60° C., and then treated with 1 normal HCl. The hydrochloric acid is utilized to convert the excess barium hydroxide to water soluble barium chloride pursuant to the following reaction:

$$Ba(OH)_2 + 2HCl \rightarrow BaCl_2 + 2H_2O \qquad (5)$$

Hydrochloric acid is added dropwise until a pH of approximately 1–2 is attained.

The residue and the mother liquor is thereafter dialyzed into a dialyzate and tenate, usually for a period of at least 16 to 24 hours. The dialyzate is then tested with $AgNO_3$. When no more turbidity appears due to the precipitation of the chloride, the dialysis is complete.

In analyzing the product produced by the process of the instant invention, an X-ray diffractogram was taken utilizing Philips X-ray diffractometer coupled to a Dapple computer for display. In analyzing an X-ray diffractogram, such as that depicted in the FIGURE, the position of the line along the horizontal axis corresponds to the ray diffracted by a given set of crystal planes. Thus, the separation between the lines at some given X-ray wavelength is a measure of the distance of separation between different sets of planes in the structure of the crystal. The height of the line provides a relative measure of the intensity. A weakly diffracting set of planes will yield a shorter vertical length of lines in the diffractogram. Thus, in comparing the unknown and the standard, one looks for the match between the positions and heights of the lines in the diffractogram.

The following examples illustrate the production of a perovskite-type compound, barium titantate, according to the process of the present invention.

EXAMPLE 1

136.14 gms of the liquid $(i\text{-}BuO)_4Ti$ is introduced dropwise into a beaker containing 138.68 gms of $Ba(OH)_2 \cdot 8H_2O$ crystalline powder which is 10% in excess of the stoichiometric equivalent. The mixture is covered with deionized $H_2O$. The mixture is heated in a pressure cooker to the steam-venting point which corresponds to a saturated-steam pressure of 2 atm at ~120° C. and held at that point for 6 hours. After cooling, the contents of the beaker is heated to ~80° C. and treated with 1N HCl until a pH between 1 and 2 is attained. The desired amount of acidity (pH=1–2) is attained when 130 mls of 1N HCl is added. Then, in a quantitative manner, the residue plus mother liquor is transferred into a dialysis bag and dialyzed overnight. The residue and liquor is then transferred quantitatively to another beaker where most of the supernatant liquor is siphoned off. After repeated washings with $CH_3OH$, the residue is dried over a steam bath. The methanol removes residual water.

A good yield of 92.52 gms of $BaTiO_3$, approximately 99% yield is obtained. The FIGURE is an X-ray diffractogram. The X-ray diffractogram of the product shows a good agreement with that of tetragonal $BaTiO_3$. In looking at the FIGURE, note the computer match with the standard with respect to two features, the positions of the lines and the vertical heights (intensities). Based on the exact match between the X-ray ASTM standard and the product of the instant invention, as shown in the X-ray diffractogram, the $BaTiO_3$ produced by the process of the instant invention is in its pure tetragonal phase.

EXAMPLE 2

365.00 gms of the liquid $(i\text{-BuO})_4Ti$ is introduced dropwise into a beaker containing 371.60 gms of $Ba(OH)_2 \cdot 8H_2O$ crystalline powder which is 10% in excess of the stoichiometric equivalent. The mixture is covered with deionized $H_2O$. The mixture is heated in a pressure cooker to the steam-venting point which corresponds to a saturated-steam pressure of 2 atm at $\sim 120°$ C. and held at that point for 6 hours. After cooling, the contents of the beaker is heated to $\sim 80°$ C. and treated with 1N HCl until a pH between 1 and 2 is attained. The desired amount of acidity (pH=1-2) is attained when 130 mls of 1N HCl is added. Then, in a quantitative manner, the residue plus mother liquor is transferred into a dialysis bag and dialyzed overnight. The residue and liquor is then transferred quantitatively to another beaker where most of the supernatant liquor is siphoned off. After repeated washings with $CH_3OH$, the residue is dried over a steam bath. The methanol removes residual water.

A good yield of 223.12 gms of $BaTiO_3$, approximately 96% yield is obtained.

What is claimed is:

1. A low temperature method of preparing a compound of the formula:

$$ABO_3$$

wherein
A=Ba, Sr, Ca and Pb; and
B=Ti, Zr and Hf,
comprising the steps of:
 (a) reacting a B-alkoxide with at least a stoichiometric amount of aqueous A-hydroxide;
 (b) heating the reaction mixture to an initial temperature of 100° C.-250° C. at 1-40 atmospheres of pressure to form a reaction product;
 (c) cooling the reaction product to a temperature below 40° C. and thereafter, heating it to a subsequent temperature of approximately 40° C. to 60° C.;
 (d) dialyzing the reaction product to form a dialyzate and a tenate and recovering the tenate.

2. The method of claim 1 wherein the initial reaction temperature is 120° C. at 2 atmospheres of pressure.

3. The method of claim 2 wherein the initial heating step comprises heating in saturated steam pressure.

4. The method of claim 3 wherein the aqueous A-hydroxide is in 10% excess of the stoichiometric equivalent.

5. A low temperature method of preparing a perovskite-type compound of the formula:

$$ABO_3$$

according to claim 1 wherein A is barium and B is titanium.

6. The method of claim 5 wherein the initial reaction temperature is 120° C. at 2 atmospheres of pressure.

7. The method of claim 6 wherein the initial heating step comprises heating in saturated steam pressure.

8. The method of claim 7 wherein the aqueous barium hydroxide is in 10% excess of the stoichiometric equivalent.

9. A method of producing barium titanate comprising the steps of:
 (a) reacting titanium iso-butoxide with at least a stoichiometric amount of aqueous barium hydroxide;
 (b) heating the reaction mixture to an initial temperature of 100° C.-250° C. at 1-40 atmospheres of pressure to form a reaction product;
 (c) cooling the reaction product to a temperature of below 40° C. and thereafter heating it to approximately 40° C. to 60° C.;
 (d) treating the reaction product with hydrochloric acid until a pH of 1-2 is attained;
 (e) dialyzing the reaction product into a dialyzate and tenate;
 (f) recovering the tenate and washing it with methylalcohol; and
 (g) drying the remaining residue.

10. The method of claim 9 wherein the initial reaction temperature is 120° C. at 2 atmospheres of pressure.

11. The method of claim 10 wherein the initial heating step comprises heating in saturated stem pressure.

12. The method of claim 11 wherein the aqueous barium hydroxide is in 10% excess of the stoichiometric equivalent.

* * * * *

UNITED STATES PATENT AND TRADEMARK OFFICE
CERTIFICATE OF CORRECTION

PATENT NO. : 4,636,378

DATED : January 13, 1987

INVENTOR(S) : Ricardo C. Pastor et al

It is certified that error appears in the above-identified patent and that said Letters Patent is hereby corrected as shown below:

Column 5, line 4, after "$Ba_{1-x}Sr_x$" and before "$O_3$" insert --Ti--.

Column 5, line 9, after "$Ba_{1-x}Sr_x$" and before "$O_3$" insert --Ti--.

Signed and Sealed this

Twenty-ninth Day of September, 1987

Attest:

DONALD J. QUIGG

Attesting Officer     Commissioner of Patents and Trademarks